Figure 1:
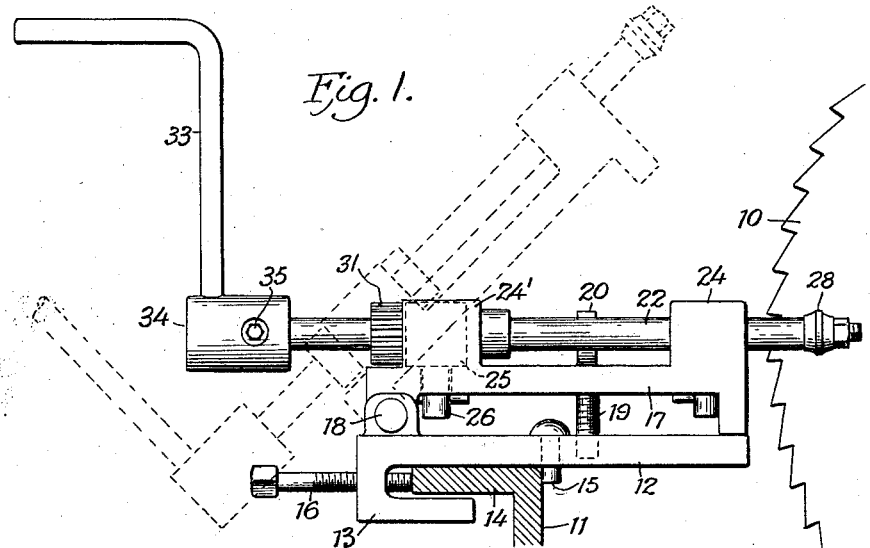

Sept. 23, 1930.　　F. W. BERNERO　　1,776,463
SAW TENSIONING TOOL

Filed Sept. 24, 1928

INVENTOR.
Floyd W. Bernero,
BY
John W Farley
ATTORNEY.

Patented Sept. 23, 1930

1,776,463

UNITED STATES PATENT OFFICE

FLOYD W. BERNERO, OF MEMPHIS, TENNESSEE

SAW-TENSIONING TOOL

Application filed September 24, 1928. Serial No. 308,099.

My said invention relates to a saw stretching or tensioning device and it is an object of the same to provide a highly efficient device of the character described, such as can be used in mills without dismounting the saws. Saws of the gin type are largely used in cotton seed oil mills for delinting the cotton seed. These saws are mounted in sets or gangs consisting of a coaxial series of saws on a shaft or mandrel and that revolve at high speed hence must be securely fastened to the mandrel, while the friction due to the hard surface of the seed causes the outer periphery of the saw to expand and stretch in well known manner. With my device the saws can be brought back to proper shape without dismounting them or removing them from the mill and it is of course possible also to set up the device in a shop and bring saws or gangs of saws to the shop for treatment.

Figure 2:
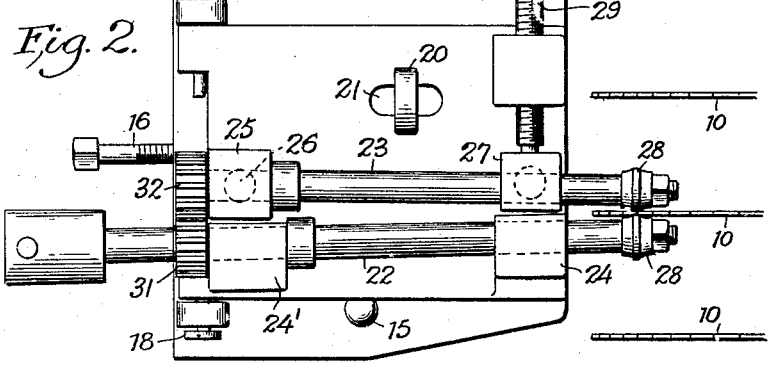

Referring to the drawings, which are made a part of this application and in which similar reference characters indicate similar parts:

Fig. 1 is a side elevation of my device with a support shown in section,

Fig. 2, a plan, and

Figure 3:
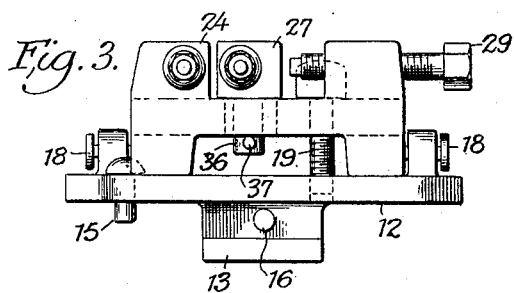

Fig. 3, a front end view.

In the drawings reference character 10 indicates saws which may be assumed to be arranged in a coaxial series, either in the mill or elsewhere. A holder extends along the front of the series of saws, said holder comprising a flat bar 14 supported on legs 11. A base 12 has a hooked portion 13 adapted to engage under the flat bar 14 and is provided with a movable abutment 15 in the form of a pin that can be pulled up to permit the hook 13 to pass under the flat bar 14, after which a set screw 16 can be set up against the flat bar 14 to draw abutment 15 back against the holder and thus secure the base rigidly in position opposite a saw to be tensioned. A support 17 is pivotally mounted on the base adjacent the rear end of the base as indicated at 18. As here shown two pins 18 serve to connect the support to the base and a screw 19 extending into the base is provided with a flat head 20 adapted to pass through a slot at 21 in the support after which it may be turned as indicated in Fig. 2 to lock the support down on the base. Two shafts 22 and 23 are journaled on the support, in bearings 24 to 26, one set of bearings 24 and 24′ being indicated as rigidly secured to the support, the bearing 25 for shaft 23 being pivoted at 26 and the bearing 27 floating on the support. A roller 28 is provided at the forward end of each shaft, these rollers coacting to stretch the saw. The pivotal mounting of shaft 23 permits the rollers to be separated in positioning them for operation on the saw or in removing them therefrom and a set screw 29 holds the pivoted shaft in adjusted position for operation on the saw.

For driving the device I have provided means consisting of intermeshing gears 31 and 32 on the respective shafts 22 and 23 and a crank 33 mounted on shaft 22 by means of a sleeve 34 which is secured to the shaft by a set screw 35 having a hexagonal opening to receive the end of a wrench. A projection 36 extends downward from the bearing 27 to guide the same and a cotter pin 37 is inserted through a hole in the projection to prevent it from rising.

In the operation of my device it is positioned on the bar 14 as above stated and parts carried by pivots 18 are moved into the dotted line position of Fig. 1, whereupon the entire device may be slid along the bar 14 to bring the rollers 28, 28 in position adjacent a saw. Thereafter the support is brought down to the full line position of Fig. 1, the shafts 22 and 23 being appropriately located to bring the rollers 28 into operative engagement with the saw. The screw 20 having been turned to lock the support down and the set screw 16 having been set up to hold the base in place the crank 33 may now be rotated to drive the rollers, which will drive the saw and apply pressure to both sides thereof in a manner to obtain the desired result in an efficient and expeditious manner. Thereupon the set screw 16 and the screw 20 are again manipulated to permit the support to be moved toward the dotted line position and the base to be slid along the holder into operative relation to another saw and so on.

The rollers 28 have a ridge at the center at 38 and taper from this ridge toward each end. They are held on the shafts by nuts 39 engaging reduced threaded portions of the shafts.

It will be obvious to those skilled in the art that various modifications may be made in my device without departing from the spirit of the invention and therefore I do not limit myself to what is shown in the drawings or described in the specification but only as indicated in the appended claims.

Having thus fully described my said invention, what I claim as new and desire to secure by Letters Patent, is:

1. A saw-stretching or tensioning device comprising a base, a support, tensioning means mounted on and projecting forward from the support, and a pivotal mounting for the support whereby the tensioning means may be moved out of the way of rotary saws arranged in a coaxial series to permit relative endwise movement between the saws and the tensioning device.

2. A saw-stretching or tensioning device comprising a base, a pair of approximately parallel shafts, means for driving the shafts simultaneously, rollers on the shafts for engaging opposite faces of a saw, and a support on which the shafts are journaled said support being pivotally mounted on the base to swing on an axis extending transversely of said shafts whereby the support can be moved on its pivot into a position permitting relative longitudinal movement of the stretching device and a series of coaxial rotary saws.

3. A saw-stretching device comprising a base, a pair of approximately parallel shafts, means for driving the shafts simultaneously, rollers on the shafts for engaging opposite faces of a saw, a support on which the shafts are journaled said support being pivotally mounted on the base to swing on an axis extending transversely of said shafts whereby the support can be moved on its pivot into a position permitting relative longitudinal movement of the stretching device and a series of coaxial rotary saws, and means for securing the support in operative position.

4. A saw stretching device comprising a base, a pair of approximately parallel shafts, means for driving the shafts simultaneously, rollers on the shafts for engaging opposite faces of a saw, a support on which the shafts are journaled said support being pivotally mounted on the base to swing on an axis extending transversely of said shafts whereby the support can be moved on its pivot into a position permitting relative longitudinal movement of the stretching device and a series of coaxial rotary saws, and a screw rising from said base said screw having a flattened head adapted to pass through a slot in the support and be turned to lock the support in operative position.

5. A saw stretching device comprising a base, a pair of approximately parallel shafts, means for driving the shafts simultaneously, rollers on the shafts for engaging opposite faces of a saw, a support on which the shafts are journaled said support being pivotally mounted on the base to swing on an axis extending transversely of said shafts whereby the support can be moved on its pivot into a position permitting relative longitudinal movement of the stretching device and a series of coaxial rotary saws, a pivotal mounting for one of said shafts on said support whereby said shaft can be moved to separate said rollers to a greater or less degree, and means for securing said shaft in adjusted position relatively to the other shaft.

In testimony whereof I affix my signature.

FLOYD W. BERNERO.